United States Patent [19]
Gold

[11] Patent Number: 5,759,411
[45] Date of Patent: Jun. 2, 1998

[54] MIXING DRUM FOR SLURRY WITH HIGH SUSPENDED SOLIDS CONCENTRATION

[76] Inventor: Dennis D. Gold, 215 Big Oak Dr., Franklin, Pa. 16323

[21] Appl. No.: 677,359

[22] Filed: Jul. 5, 1996

[51] Int. Cl.[6] .................................................. C02F 1/52
[52] U.S. Cl. .......................... 210/738; 210/727; 210/801; 23/313 R
[58] Field of Search ................. 23/313 R; 210/198.1, 210/205, 206, 726, 727, 738, 519, 801; 366/220

[56] References Cited

U.S. PATENT DOCUMENTS

| | | | |
|---|---|---|---|
| 4,101,421 | 7/1978 | Hultsch | 210/781 |
| 4,127,388 | 11/1978 | Maczkó et al. | 23/313 R |
| 4,137,029 | 1/1979 | Brooks | 23/313 R |
| 4,622,152 | 11/1986 | Resing et al. | 210/769 |
| 4,816,167 | 3/1989 | Vanderslice | 210/801 |
| 5,037,286 | 8/1991 | Roberts | 23/313 R |
| 5,094,604 | 3/1992 | Chavez et al. | 23/313 R |

Primary Examiner—Peter A. Hruskoci
Assistant Examiner—Betsey J. Morrison
Attorney, Agent, or Firm—Vivian L. Steadman; Harry I. Leon

[57] ABSTRACT

A horizontally-mounted, rotatable drum for mixing chemical additives with an aqueous suspension in order to promote agglomeration of suspended solids and for simultaneously separating water from them. With the drum, slurries of mining silt, clay, sludge and the like already partially dewatered to between about 50% and 60% moisture content can be further dewatered; reductions to 40% moisture content have been obtained. Supplied as a wet slurry to the drum through a hollow tube which also serves as an axle, the slurry is diverted, through a tubular branch fluidly connected to the tube, towards a vertical wall forming one end of the drum. Fed at a rate of between 200 and 300 gallons per minute, the slurry forcefully impinges against the vertical wall, simultaneously subjecting agglomerated particles in the slurry to high shear forces and freeing water. Downstream, before each of two spaced apart, annular retaining rings affixed to the drum, the slurry tends to pool. There chemical additives injected at strategic points promote further agglomeration. Slowed in their travel by the rings as well as by paddles attached to the drum sidewall, the suspended particles grow. Upon reaching the paddles, the solids in the suspension are sufficiently agglomerated so that the paddles can lift them upwardly while simultaneously water drains away. Ultimately, water and solids flow in two distinct streams from the open end of the rotating drum.

4 Claims, 3 Drawing Sheets

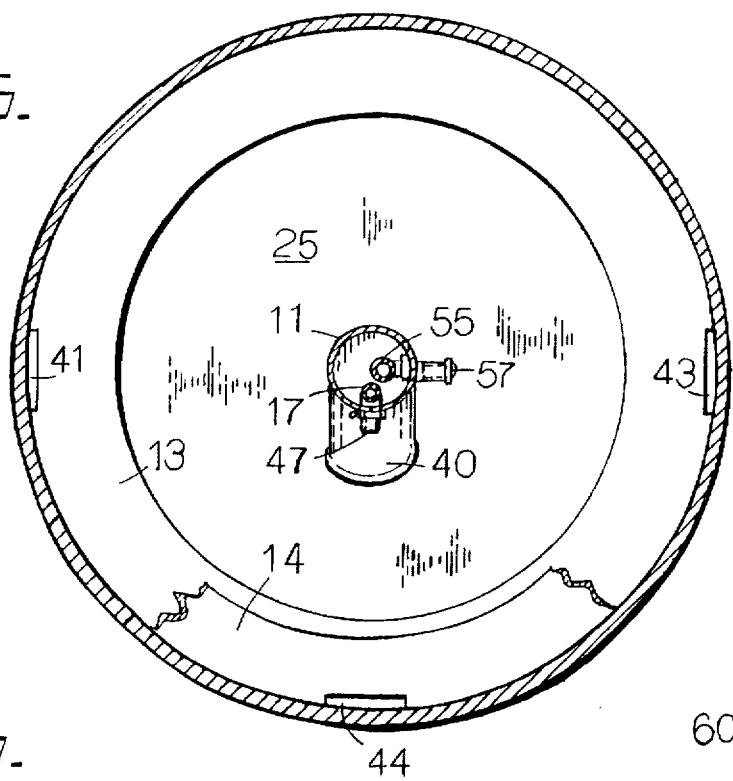
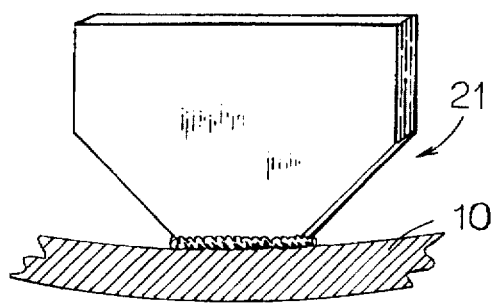
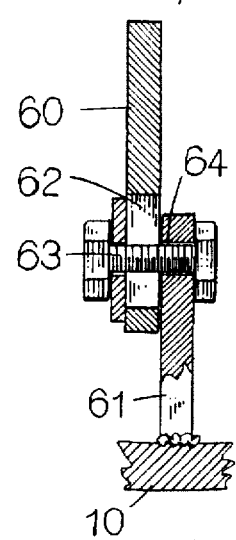
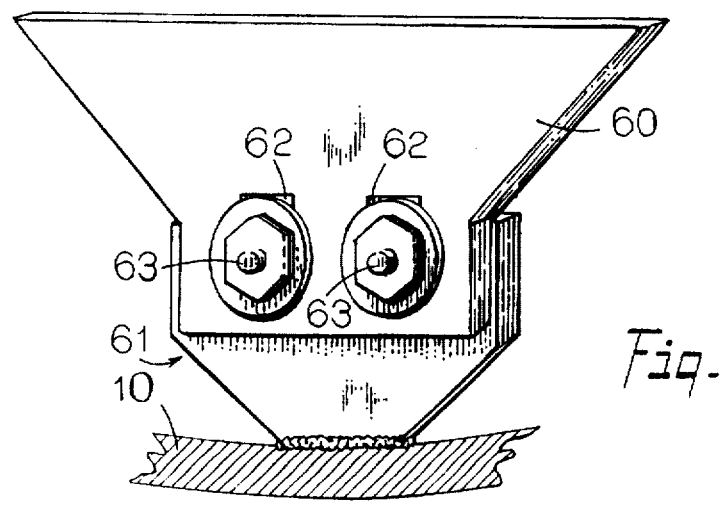

MIXING DRUM FOR SLURRY WITH HIGH SUSPENDED SOLIDS CONCENTRATION

BACKGROUND OF THE INVENTION

1. Field of the Invention

This invention relates generally to machines for dewatering aqueous suspensions of large colloidal particles in which chemical additives are mixed with the suspension to promote the agglomeration of these particles.

2. Description of the Prior Art

The sand and gravel industry generates tremendous quantities of largely unmarketable silts and clays suspended as aqueous slurries. The dewatering of these slurries is complicated by the presence therein of a high percentage of large colloidal particles, commonly referred to as "ultrafines". Indeed, 80–90 percent of the suspended solids present in such a slurry are so fine that, like grains of flour, they pass through a 325 mesh screen. Without agglomeration to reduce their settling time, these "ultrafines" would take years to settle out.

Devices which can be utilized to mix polymers with slurries of suspended solids for the purpose of promoting their flocculation and subsequent settling are well-known in the prior art. Unfortunately, each of these devices works best when the moisture content of a predominantly colloidal slurry is relatively high (at about 70%). Even then, the slurry is somewhat drier than occurs naturally; after settling in a pond for an extended period of time, slurries typically have a solids content of only about 15%.

In any event, none of these earlier devices works satisfactorily when the moisture content drops below about 60%. Once the moisture content of such a slurry falls too far, polymer/slurry mixtures cannot be made to floc using conventional mixers. Typically, such a failure occurs when the slurry has a suspended solids content in the range of 40% to 50% (50% to 60% moisture content). Moreover, a slurry having a suspended solids content which is too high tends to plug conventional mixing systems which operate with a thickener underflow.

In U.S. Pat. No. 5,560,834, there is described a method and device for promoting a bridging phenomenon known as particle bonding in which large aggregates are formed within a partially dewatered, previously flocculated slurry of ultrafine particles. The device comprises a belt press which uses a plow and pressure technique to destabilize existing aggregates by applying minimal shear to them. With this belt press, suspensions having a relatively low initial moisture content of between 40% and 55% have been further dewatered to between 27% and 30% moisture content.

SUMMARY OF THE INVENTION

The primary object of the present invention is to provide an improved method and apparatus for promoting the agglomeration of colloidal particles in an aqueous suspension and simultaneously separating water from them, so that the moisture content of such suspensions, including those having a relatively high suspended solids content, can be substantially reduced.

A further object of the present invention is to provide an apparatus for removing water from a partially dewatered slurry in such a way that any polymers added to promote flocculation of colloidal particles in the slurry remain with the particles rather than being partitioned into the water phase, so that the polymers can be utilized as efficiently as possible.

A still further object of the present invention is to provide an apparatus for reducing the moisture content of a slurry of mining silt, clay, sludge or the like which has already been partially dewatered from between about 50% and 60% moisture content to about 40% moisture content in preparation for subjecting it to a final dewatering step on the belt press described in U.S. Pat. No. 5,560,8346.

A still further object of the present invention is to provide an apparatus for subjecting a so-called "high gravity" aqueous suspension having a specific gravity in the range of between 1.35 and 1.40 to intense mixing in a high shear zone and for subsequently promoting the formation of an agglomerated mass of floc within this suspension downstream of this zone.

In accordance with the present invention, there is provided a drum with wall-mounted, internal baffles for mixing chemical additives with a slurry of ultrafine particles. Rotatable about a generally horizontal shaft, the drum has both an open end and a closed end. The open end, which defines a plurality of discharge ports, is elevated slightly, so that slurry, once introduced into the drum, tends to pool near the closed end.

The baffles include first and second annular retaining rings and multiple paddles disposed in a plurality of annular rows forming a staggered array between the second retaining ring and the slightly elevated open end of the drum. Spaced apart from each other, each of the annular retaining rings is rigidly affixed along its outer periphery to an inner wall of the drum, with the first ring protruding inwardly therefrom further than does the second ring. The retaining rings and the closed end, together with a portion of the inner wall of the drum which is instantaneously lowest as it rotates, define two contiguous, shallow basins in which slurry fed into the drum near its closed end can collect before overflowing into the remainder of the drum.

The shaft, which is fabricated from a hollow tube, serves both as an axle for the drum and as means for feeding slurry and chemical additives into it. Fluidly connected to this feed shaft is a tubular branch which is disposed within the drum itself. The branch extends downwardly and rearwardly towards a vertical wall forming the closed end of the drum. Blocking off the feed shaft immediately downstream of the tubular branch is a wear plate; the wear plate is used to fluidly isolate the remainder of the shaft from the slurry. The portion of the feed shaft so isolated defines a conduit through which a plurality of feed lines pass.

Employed to transport one or more chemical additives such as coagulants and flocculants, each feed line terminates in a spray nozzle which-fluidly communicates with the inside of the drum through a separate opening formed in the feed shaft. In the preferred embodiment, one of the spray nozzles is employed to inject coagulant into the slurry as it pools immediately upstream of the first retaining ring; other spray nozzles are utilized to add polymers at points downstream of the second retaining ring in close proximity to first and third annular rows of paddles. Preferably, the spray nozzles are not only separated from each other longitudinally along the feed shaft but also alternate with spray heads fluidly connected to a water supply line running along it. The spray heads comprise means for cleaning the drum to prevent an accumulation of dried solids upon working surfaces of the drum.

In the preferred embodiment, the paddles have generally planar working faces; and the working face of each paddle in any one of the annular rows is disposed generally perpendicularly to the working faces of the paddles located proximate therewith in a contiguous annular row and is spaced apart from them in both the longitudinal and transverse directions, thus forming a staggered array. Moreover, for each working face, its leading and trailing edges are positioned so that they are spaced apart generally equidistant from the leading and trailing edges, respectively, of the working faces of other paddles which are contiguous with it within the same annular row.

In use, the drum is rotated about its feed shaft at a rate which varies with the nature of the suspension being dewatered. In a typical application, rates in the range of 4 rpm to 10 rpm are employed.

Once a slurry of ultrafines has been pretreated with polymers to promote their agglomeration, it is then fed into the rotating drum at a rate of between 200 and 300 gallons per minute. Upon entering the drum, the slurry forcefully impinges against the vertical wall at the closed end of the drum and upon any slurry pooled proximate therewith, causing it to boil and roll. In the process, shear forces destabilize colloids in the slurry; and water surrounding them is released. Moreover, existing bonds within agglomerated particles are disrupted, exposing unstabilized polymer chains. Downstream, in close proximity with the first retaining ring and between it and the second retaining ring, where the slurry tends to pool, the unstabilized polymer chains connect to other unstablized chains; and larger, more stable particles are created.

To facilitate aggregate formation further, coagulants and/ or flocculants can be injected into the slurry through the spray nozzles, with coagulants being utilized to reduce electrostatic repulsion between colloidal particles and flocculants such as long chain polymers being used to create bridges between smaller colloidal particles.

Slowed by the retaining rings, agglomerated particles present in the slurry tend to increase in size; and more water is released. Once the slurry reaches the paddles, it is sufficiently dewatered that they can lift it a substantial distance as they sweep upwardly from the instantaneously low side of the drum. Experience has shown that both the rings and the paddles are critical for dewatering the so-called "high gravity" slurries. Moreover, field tests show that with the present invention, freed water, virtually unimpeded by the rings and paddles, drains rapidly away from the slurry and flows from the open end of the rotating drum as a separate stream.

BRIEF DESCRIPTION OF THE DRAWINGS

Further details are explained below with the help of the examples illustrated in the attached drawings in which:

FIG. 5 is a transverse cross-section of the drum of FIG. 1 showing the closed end thereof and a fragmentary portion of the second retaining ring;

FIG. 6 is a transverse cross-section, on an enlarged scale, of a portion of the drum of FIG. 1, including one of the paddles;

FIG. 7 is a transverse cross-section of a portion of the drum of FIG. 1, including one of the paddles in an alternative embodiment to which has been attached an adjustable extension; and FIG. 8 is a longitudinal cross-section of a portion of the drum of FIG. 1, including one of the paddles.

DETAILED DESCRIPTION OF THE PREFERRED EMBODIMENT

Figure 2:
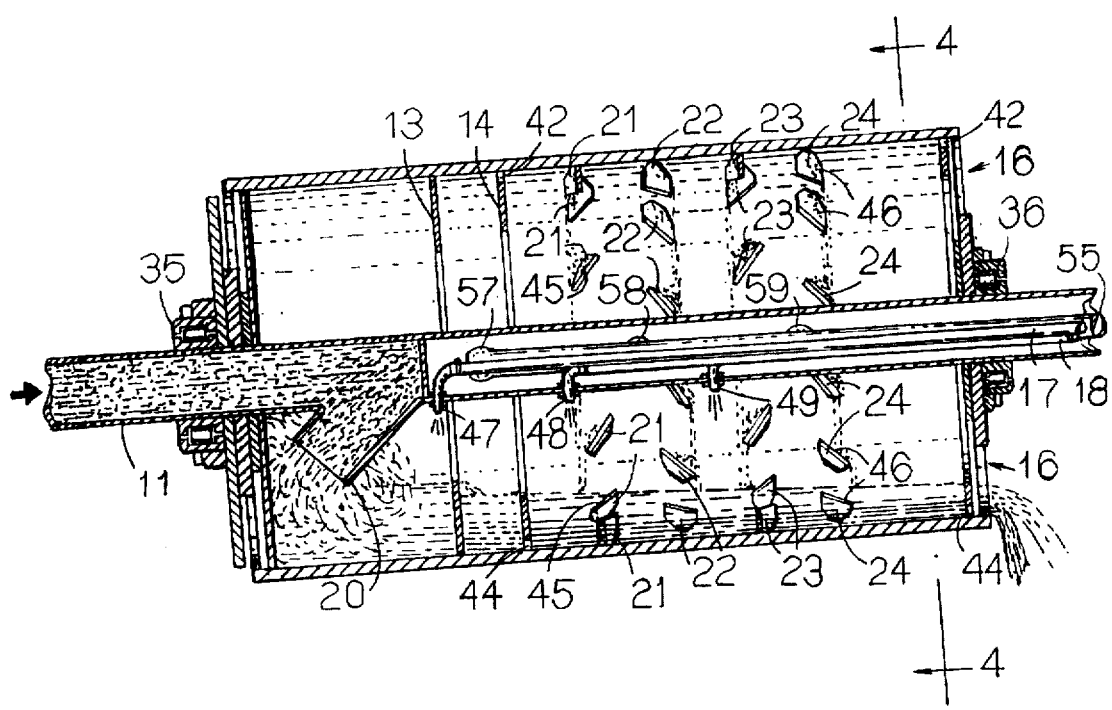
FIG. 2 is a view on an enlarged scale and partially in cross-section of the drum according to FIG. 1, the drum being shown when it is being used to dewater a suspension, which is illustrated by dashed lines superimposed upon the drum.

In accordance with the invention, an open-ended drum 10, rotatable about a hollow shaft 11, includes at least two annular retaining rings 13, 14 and a plurality of paddles 21, 22, 23, 24 arrayed in rows (FIG. 2). Both the retaining rings 13, 14 and paddles 21, 22, 23, 24 are rigidly affixed to the generally cylindrical inner wall of the drum 10. They can be used to mix one or more chemical additives with an aqueous suspension supplied to the drum 10 through the hollow shaft 11 and to facilitate the separation of water from the resultant mixture.

A tubular branch 20 fluidly connected to the shaft 11 is used to direct slurry supplied thereto towards a vertical wall 25 forming an end 15 of the drum 10 (FIG. 2). Fed at a rate of between 200 and 300 gallons per minute, the slurry forcefully impinges against the vertical wall 25, simultaneously subjecting agglomerated particles in the slurry to high shear forces and freeing water. Mixing of such high energy appears to facilitate the escape of water molecules that would otherwise be bound, along with a diffuse cloud of ions known as the Gouy layer, to each colloidal particle by stripping the particle of this layer. Blocking off the shaft 11 immediately downstream of the tubular branch 20 is a wear plate 40; the wear plate comprises means for fluidly isolating the tubular branch from a portion of the hollow shaft 11. The portion of the shaft 11 so isolated defines a conduit through which a plurality of feed lines pass.

Figure 1:
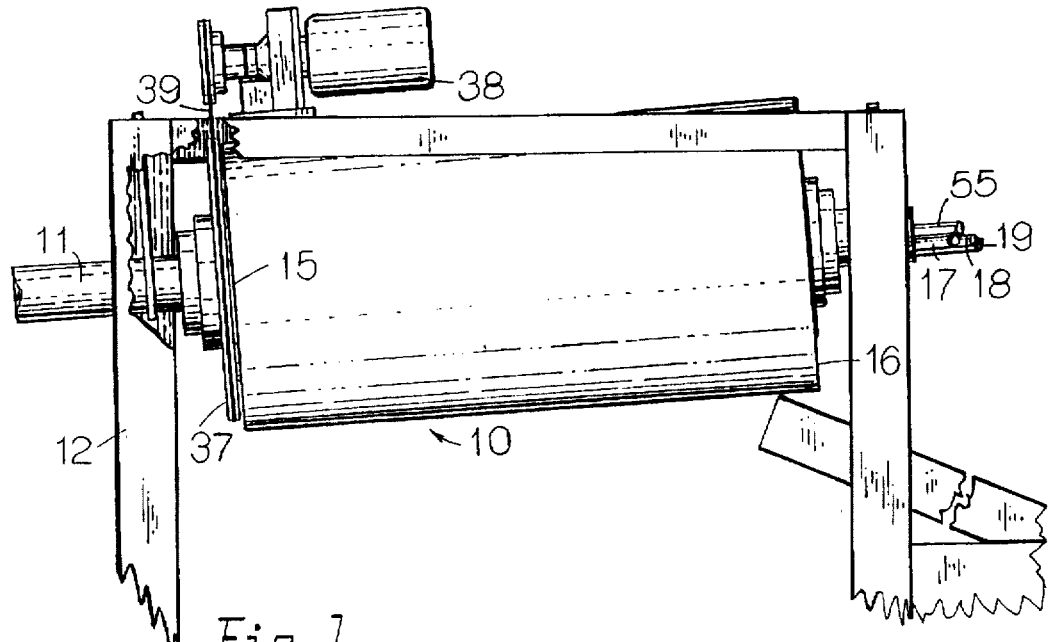
FIG. 1 shows, in a somewhat simplified elevational view, a machine including a rotatable drum for carrying out the method according to the present invention.
Figure 3:
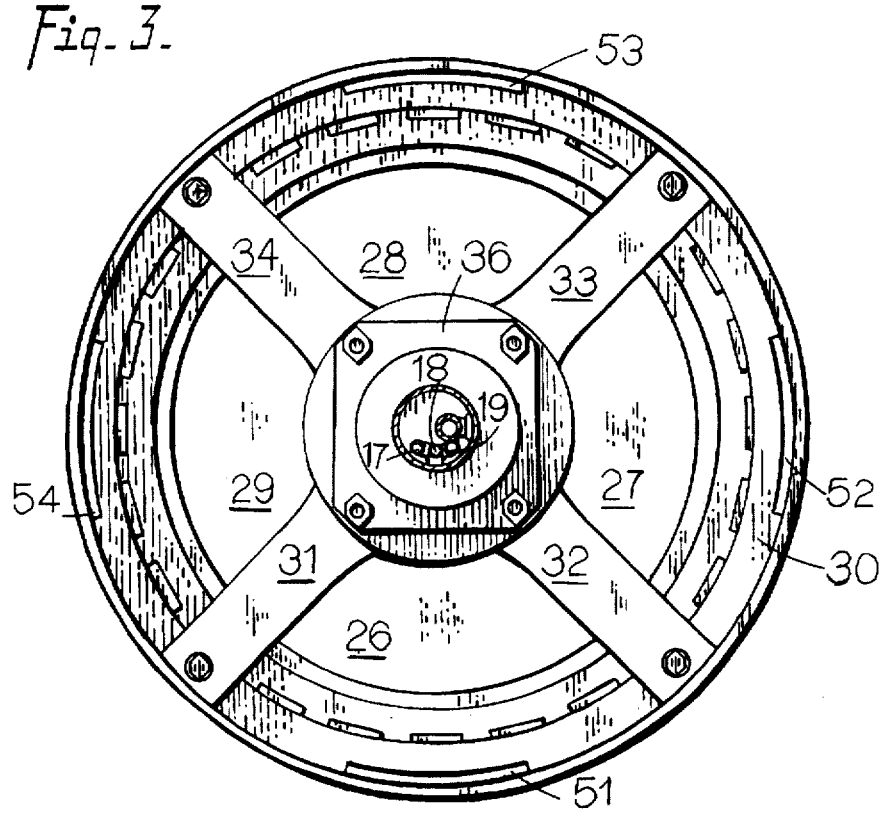
FIG. 3 is an end view on a further enlarged scale showing the discharge ports of the drum according to FIG. 1.

Distal from the vertical wall 25, an annular rim 30 disposed along the outer periphery of the drum 10 and support structures 31, 32, 33, 34, which are preferably star bolted thereto, define an open end 16 having a plurality of discharge ports 26, 27, 28, 29 (FIG. 3) In the preferred embodiment, the rim 30 measures, by way of example, about 1 ½ inches in height. As is best illustrated in FIGS. 1 and 2, the shaft 11 is disposed along the longitudinal axis of the drum 10 and is rotatably received by a pair of flange bearings 35, 36 mounted, respectively, on the support structures 31, 32, 33, 34 at the end 16 and similar structures (not shown) bolted to the opposing end 15. A drive belt 39 and motor 38 which are mechanically linked, together with a pulley 37 affixed to the end 15, comprise means for rotating the drum 10 about the shaft 11. Typically, the drum 10 is rotated at a rate of between 4 rpm and 10 rpm.

Suitable suspensions for use with the drum 10 include slurries of mining silt, clay, sludge and the like produced by either industrial or municipal wastewater treatment processes. The drum 10 can reduce the moisture content of such slurries, including those which have already been partially dewatered to between about 50% and 60% moisture content, to as low as 40% moisture content. A belt press (not shown) such as that described in U.S. Pat. No. 5,560,834 can then be utilized to further dewater the suspension.

As is best seen in FIG. 1, means for mounting the drum 10 with its longitudinal axis disposed at a slight incline includes the shaft 11 and frame 12. In the preferred embodiment, the drum 10, which measures, by way of example, about 40 inches in length, is mounted so that the open end 16 is about 3 inches higher than the feed end 15.

Because of this height difference, slurry introduced into the drum 10 forms an initial pool proximate with the feed end 15 (FIG. 2).

Downstream, means for temporarily retaining agglomerated solids that tend to settle rapidly, settling out within this initial pool and/or within a shallow basin located immediately downstream thereof, includes the rings 13, 14 (FIG. 2). Rigidly affixed along their entire outer peripheries to the inside drum wall, the rings 13, 14 are spaced apart from each other by a distance which measures, by way of example, about 3 inches. Moreover, the first ring 13 projects inwardly further than does the second ring 14 so as to create a shallow basin between the two rings. With this configuration of spaced apart, annular rings 13, 14, the agglomerated solids tend to build up behind a succession of barriers rather than behind a single barrier, thus enhancing the agglomeration process. In the preferred embodiment, the ring 13 measures, by way of example, 3 inches in height and the ring 14, 2 inches in height.

Figure 4:
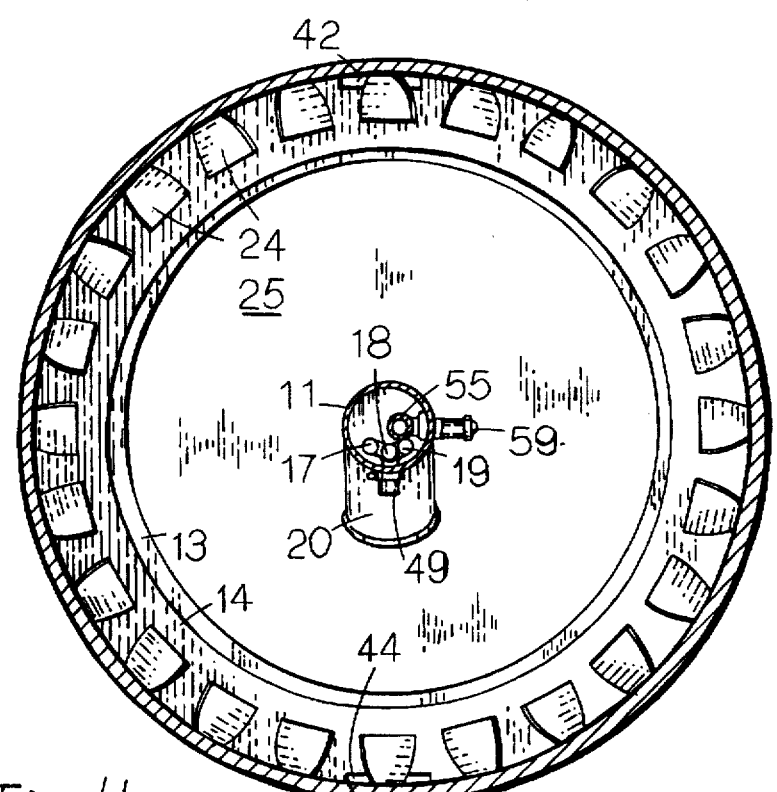
FIG. 4 is a transverse cross-section of the drum taken along line 4—4.

Moreover, each of the retaining rings 13, 14 defines a pair of elongated slots 41, 43, 42, 44, respectively, used for cleanout purposes (FIGS. 4 and 5). Each slot 41, 42, 43, 44 preferably measures, by way of example, 4 inches long by ½ inch deep. The alignment of the slots 41, 43 relative to the slots 42, 44 is staggered to prevent channelization of the flow.

Downstream, annular rows of paddles 21, 22, 23, 24 are arrayed so as to further impede the travel of agglomerated particles (FIG. 2). In the preferred embodiment, the paddles 21, 22, 23, 24 are arrayed in four annular rows each of which has twelve paddles. The paddles 21, 22, 23, 24 are preferably fabricated of ⅛ inch steel and are affixed to the inside wall of the drum 10 by welding or the like. In the preferred embodiment, each paddle 21, 22, 23, 24 has a generally planar working face 45, 46 which measures, by way of example, between about 2 and 2¼ inches in height and tapers from about 3 inches in length to about 1.2 inches proximate with the edge of the paddle attached to the drum. As the drum 10 rotates, the paddles 21, 22, 23, 24 plow through slurry accomlated between the second retaining ring 14 and the rim 30.

An alternative embodiment includes means for adjusting the height of the paddles 61 (FIGS. 7 and 8). The adjusting means includes an extension 60 having vertical slots 62, 62' formed therein for slideably receiving bolts 63 (FIGS. 7 and 8). Similarly, the paddles 61 define holes 64, 65. In the assembled combination, a pair of bolts 63 engage both the holes 64, 65 and the slots 62, 62', respectively. With a preferred embodiment of the extension 60 affixed to each paddle 21, 22, 23, 24, the overall distance which the extension protrudes inwardly from the drum sidewall can be as much as 4 inches. The height of the extension 60 relative to the drum sidewall is best decided, by field trial, to accommodate variations in the physical properties of the slurry and to promote dewatering of the agglomerated material formed therefrom.

As is best illustrated in FIG. 2, means for injecting at least one liquid into the drum 10 includes spray nozzles 47, 48, 49 fluidly connected to feed lines 17, 18, 19 which pass through a portion of the hollow shaft 11 fluidly isolated from the slurry by the wear plate 40. In the preferred embodiment, the feed lines 17, 18, 19 are fabricated of ½ inch diameter vinyl tubing.

The spray nozzle 47, which is located immediately upstream of the first ring 13, is employed to inject liquid containing chemical additive(s) into the slurry in order to promote agglomeration of suspended solids slowed in their travel by the first ring 13. Downstream of the second ring 14, chemical additive(s) can be injected into the slurry through one or both of the spray nozzles 48, 49. As is best illustrated in FIG. 2, each of the spray nozzles 48, 49 is situated immediately upstream of an annular row of paddles 21, 23.

In a typical application in which an aqueous suspension having a moisture content of 50 to 60 percent and a specific gravity in the range of between 1.35 and 2.3 (optimally 1.6) is fed into the drum 10 at the rate of 100 to 200 gpm, a suitable combination of chemical additives for promoting flocculation and coagulation includes aqueous solutions containing ¼ percent by weight of anionic polymer (such as AD605) and 30 percent by weight cationic polymer (such as CS-651). AD605 and CS-651 are available commercially from DBG Enterprises, Inc., located in Franklin, Pa. These aqueous solutions of anionic polymer and of cationic polymer are preferably introduced through the spray nozzles 47 and 48 at the rate of about 12 gallons per minute and ½ gallon per hour, respectively.

The choice of which chemical additive(s) to inject and the points at which they are best introduced is dependent upon the nature of the slurry. Both the coagulant and the flocculant must be carefully matched. Indeed, the required dosage of polymers may be strongly dependent upon the coagulant chosen. Further, minimization of chemical consumption requires matching attributes of at least one of 40 or more anionic polymers with certain properties of the colloidal suspension, including its zeta potential, pH, temperature, viscosity, and the concentration, size distribution, and average molecular weight of particles suspended therein. In general, not only does the required polymer dosage rate vary with these properties but also it is critically dependent upon the point(s) and rate at which the polymer is added to the suspension. These determinations are preferably based on experimentation including field trials with the drum 10. Once a feed sequence is established, it should remain constant unless dramatic changes in the characteristics of the feed slurry such as changes in the gradation of particle sizes, pH, zeta potential, and/or specific gravity develop.

Typically, a suspension, introduced as a wet slurry into the drum 10 through the tubular branch 20, is so wet that it does not tend to adhere to the sides of the rotating drum 10. However, upon reaching the paddles 21, 22, 23, 24, the suspended solids are sufficiently agglomerated that they can be lifted upwardly as a mass by the paddles as they sweep through the slurry accumulated on the instantaneously low side of the drum 10. At the same time the solids partially adhere to paddles 21, 22, 23, 24 and their flow is restricted, water drains freely away.

Moreover, each paddle 21, 23; 22, 24 has a working face 45, 46, respectively, which is aligned at an acute angle of about 45 degrees to the longitudinal axis of the drum 10 (FIGS. 2 and 6). Additionally, each working face 45 in the first row has its leading and trailing edges positioned so that they are spaced apart, in a longitudinal direction, generally the same distance from the leading and trailing edges, respectively, of one of the working faces 45 in the third row. Similarly, for each working face 46 in the second row, its leading and trailing edges are positioned so that they are spaced apart, in a longitudinal direction, generally the same distance from the leading and trailing edges, respectively, of one of the working faces 46 in the fourth row. Consequently, as solids slide off the paddles 21, 22, 23, 24 in each annular row, they are directed to a common point situated downwardly of that particular row. Specifically, solids falling from the first annular row of paddles 21 tend to accumulate beneath the spray nozzle 48; and solids from the second and third annular rows of paddles 22, 23 beneath the spray nozzle 49. In sum, such an array of paddles 21, 22, 23, 24 with the working faces 45, 46 so oriented not only facilitates mixing chemical additives, as they are being injected through one or both of the nozzles 48, 49, with the agglomerated particles but also, by impeding and directing the flow of these particles, promotes the frequency and efficiency of collisions between them.

Upstream of the drum 10 various preparatory-steps are preferably accomplished before the suspension is fed into the drum 10. Specifically, chemical additives are preferably mixed, in succession, with the suspension; and then it is fed into a flocculation zone (not shown) where aggregates of colloids and of polymers begin to form and settle out of solution.

Then, as the drum 10 is used, larger, more stable agglomerated particles tend to form where the slurry pools before each of the annular retaining rings 13, 14 than would otherwise occur. This phenomenon, which may be enhanced by the addition of coagulant and/or flocculant immediately upstream of the ring 13, takes place as the sheared polymers re-stabilize connecting to other unstabilized chains. Downstream, the staggered array of paddles 21, 22, 23, 24 promotes further growth of the agglomerated particles, with or without the addition of coagulants and/or flocculants, by impeding their travel while allowing freed water to drain rapidly away. Ultimately, the freed water, less impeded by the paddles 21, 22, 23, 24, flows from the discharge ports 26, 27, 28, 29 of the rotating drum 10 as a separate stream. Spaced apart and located clockwise of the dewatered slurry as the drum 10 rotates in a counterclockwise direction, this stream contains clean water when chemical additive(s) are properly used. The agglomerated solids flow over the rim 30 prior to discharging through the ports 26, 27, 28, and 29. Adjustments should be made in the dosages of coagulants and/or flocculants to upgrade the performance of the drum 10 if polymer solution is seen in this stream and/or if the slurry exiting the drum is tacky and/or viscous.

Means for cleaning the drum 10 includes elongated slots 51, 52, 53, 54 formed in the rim 30 as well as the slots 41, 43; 42, 44 formed in the rings 13, 14, respectively (FIGS. 4 and 5). Spray heads 57, 58, 59 which can be used to introduce water through a supply pipe 55 are situated immediately downstream of the spray nozzles 47, 48, 49, respectively (FIG. 2). The drum 10 should be flushed with clean water prior to each shutdown to prevent buildup of dried solids on its inside walls.

What is claimed is:

1. A method for dewatering an aqueous suspension of large colloidal particles supplied to a generally horizontally-mounted, rotating drum, comprising:

(a) forcefully impinging the suspension as a wet slurry against a generally vertical wall within the drum;

(b) temporarily pooling the suspension in at least two contiguous, shallow basins downstream of the vertical wall in such a way that agglomerated solids within the suspension tend to build up;

(c) downstream of the basins, lifting the suspension upwardly along the inner wall of the drum from the instantaneously low side thereof; and (d) discharging, as separate streams which are spaced apart from each other as they exit the drum, agglomerated solids and water which drains away from the solids as the suspension is being lifted upwardly.

2. The method according to claim 1 which further comprises the steps of directing agglomerated solids within the suspension, when they fall after the suspension is lifted downstream of the basins, towards at least one common point; and proximate with said common point, injecting at least one chemical additive into the suspension in order to promote further agglomeration of the colloidal particles therein.

3. A method for dewatering an aqueous suspension, comprising:

(a) forcefully impinging the suspension as a wet slurry against a generally vertical wall within a rotating drum mounted generally horizontally with its longitudinal axis being inclined slightly upwardly from the vertical wall to the drum outlet;

(b) temporarily retaining agglomerated solids within the suspension that tend to settle rapidly in at least two contiguous, shallow basins downstream of the vertical wall;

(c) downstream of the basins, sweeping through the suspension on the instantaneously low side of the drum with paddles to lift agglomerated solids in the suspension upwardly along the inner wall of the drum; and (d) discharging, as separate streams which are spaced apart from each other as they exit the drum, agglomerated solids and water which drains away from the solids as the suspension is being lifted upwardly.

4. The method according to claim 3 which further comprises the step of directing agglomerated solids within the suspension, when they fall after the suspension is lifted by the paddles, towards at least one common point; each paddle having an elongated working face which is rigidly affixed along its periphery to the inner wall of the drum and which protrudes inwardly therefrom, the paddles being disposed in a staggered array, the working faces of contiguous pairs of paddles which are spaced apart from each other in a direction generally parallel to the longitudinal axis being disposed generally perpendicularly to each other.

* * * * *